United States Patent [19]
Fan

[11] Patent Number: 6,079,727
[45] Date of Patent: Jun. 27, 2000

[54] OCCUPANT PEDALED SKATEBOARD

[76] Inventor: Ronnie Chee Keung Fan, 1082 Leland Dr., Lafayette, Calif. 94549

[21] Appl. No.: 09/100,149

[22] Filed: Jun. 18, 1998

[51] Int. Cl.$^7$ .................................................. B62M 1/00
[52] U.S. Cl. ............................................ 280/265; 280/257
[58] Field of Search ............................. 280/221, 11.115, 280/253, 256, 257, 265, 259, 260

[56] References Cited

U.S. PATENT DOCUMENTS

| | | | |
|---|---|---|---|
| 1,558,851 | 10/1925 | Edwards | 280/257 |
| 1,592,701 | 7/1926 | Peelle | 280/257 |
| 4,601,482 | 7/1986 | Ferez | 280/265 |
| 4,621,825 | 11/1986 | Lee . | |
| 4,861,055 | 8/1989 | Jones . | |
| 4,915,403 | 4/1990 | Wild | 280/257 |
| 5,310,202 | 5/1994 | Goodspeed . | |
| 5,351,575 | 10/1994 | Overby | 280/257 |

*Primary Examiner*—Christopher P. Schwartz
*Assistant Examiner*—C. T. Bartz
*Attorney, Agent, or Firm*—Howard Cohen

[57] ABSTRACT

A foot driven vehicle utilizing a platform. The platform is motivated on a surface utilizing a foot pedal connected to a crank. The crank further includes an endless surface which is linked to a first wheel supported to the bottom of the platform. An element which is engageable by a foot, is linked to a second wheel supported by the bottom of the platform. The element is movable to turn the second wheel for the purposes of steering. A brake is also included in the present invention for arresting the turning of the first and/or second wheels. The brake includes a flange which is also operated by the foot of the user.

14 Claims, 3 Drawing Sheets

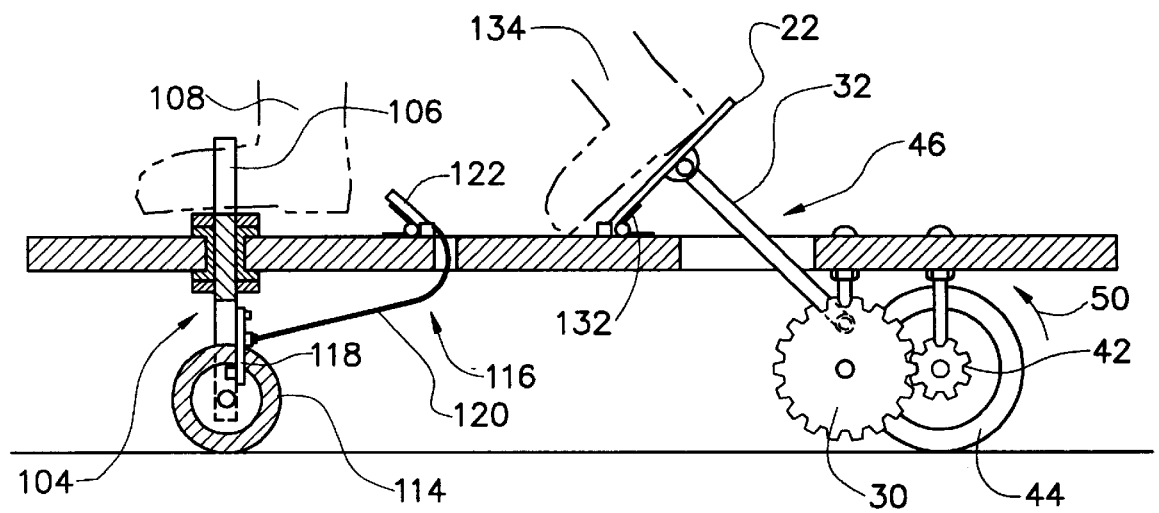
FIG. 7
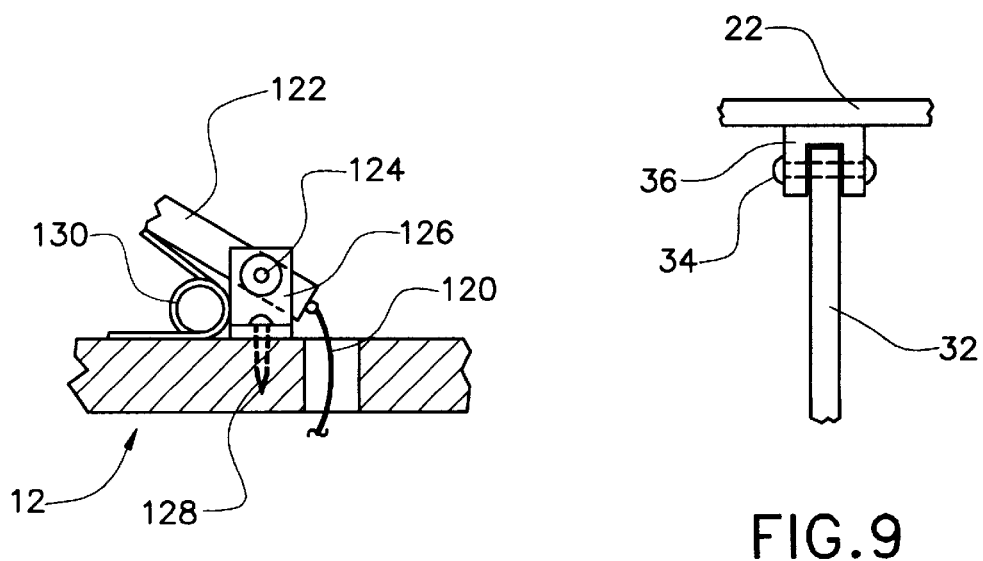
FIG. 8
FIG. 9

OCCUPANT PEDALED SKATEBOARD

CROSS REFERENCES TO RELATED DOCUMENT

The present invention is the subject of Disclosure Document S00467.

BACKGROUND OF THE INVENTION

The present invention relates to a novel and useful foot driven vehicle.

Many non-motorized vehicle platforms have been proposed and built in the past. Essentially, these items are noted as being classified as scooters, skateboards, and the like.

Although many of such scooters and skateboards are steerable and dependent on gravitational pull for operation, several designs have been proposed for driving the same.

Reference is made to U.S. Pat. No. 4,621,825 which describes an oscillating platform in which the user shifts his weight to affect forward motion of skateboard.

U.S. Pat. No. 5,310,202 shows a skateboard having a pedal mounted on the upper surface of a platform which drives a horizontally displaceable rack via a cam.

U.S. Pat. No. 4,861,055 shows a scooter having a steering bar and mechanism for converting oscillating motion onto rotary motion through the use of endless chains.

A foot driven vehicle having the capability of complete motional control, including the generating speed, stopping, and steering through foot operated mechanisms would be a notable advance in the recreational vehicle field.

SUMMARY OF THE INVENTION

In accordance with the present invention a novel and useful foot driven vehicle is herein provided.

The foot driven vehicle of the present invention utilizes a platform having motivating means for urging the platform along a surface. The motivating means includes a foot pedal connected to a crank. The crank includes an endless surface linked to a first wheel supported to the platform. The endless surface may include a friction surface or a geared surface which is capable of transmitting the rotation motion of the crank to the wheel connected to the platform. In addition, a spur gear wheel may be located intermediate the crank surface and the wheel supported by the platform. In such an embodiment, the rotation motion of the first wheel supported to the platform would be reversed in direction from the motivating means lacking the spur gear.

The foot driven vehicle of the present invention may also include a steering element engageable by the foot of the user. The element would be linked to a second wheel supported to the platform and would be movable in order to turn the second wheel about an axis generally perpendicular to the platform. Such steering element may include a stirrup-like structure. In addition, steering element may further comprise a rotatable shaft which is connected to the second wheel and to the stirrup. A bearing supported by the platform may surround the rotatable shaft to ease the turning of the shaft during the steering process.

Brake means is also provided in the present invention for selectively arresting the turning of either of the first and second wheels. The brake means may include a hinge flange engageable by the foot of the user. The hinge flange would be linked to a conventional bicycle caliper on either the first or second wheel. The brake means flange may be found on the upper surface of the platform and be in the vicinity of the motivating means foot pedal in order to permit the user to rapidly move a foot between these two control mechanisms.

It should be further noted that a third wheel may be employed in the present invention for movement with the first wheel at the lower side of the platform. The first and third wheels may be motivated by the crank which may have a pair of shafts or a pair of endless surface members such as gear wheels. Such gear wheels may be directly linked to a single or double gear along the axis of the first and third wheels, or may be linked by using intermediate spur gear to reverse the direction of turning of the first and second wheels.

It may be apparent that a novel and useful foot driven vehicle has been heretofore described.

It is therefor an object of the present invention to provide a foot driven vehicle which permits the user to control the same using only the users feet.

Another object of the present invention is to provide a foot driven vehicle which is as simple to manufacture and maintain.

A further object of the present invention is to provide a foot driven vehicle which generates torque through a gear crank mechanism.

Yet another object of the present invention is to provide a foot driven vehicle which may be safely operated on various surfaces.

The invention possesses other objects and advantages especially as concerns particular characteristics and features thereof which will become apparent as the specification continues.

BRIEF DESCRIPTION OF THE DRAWINGS

FIG. 7 is a sectional view showing another embodiment of the present invention in which the platform is depicted in section.

FIG. 8 is an enlarged side view of a portion of the brake mechanism mounted on the top portion of the platform.

FIG. 9 is a partial end elevational view of the interconnection of the crank arm to the foot pedal depicted in FIGS. 2 and 7.

Figure 1:
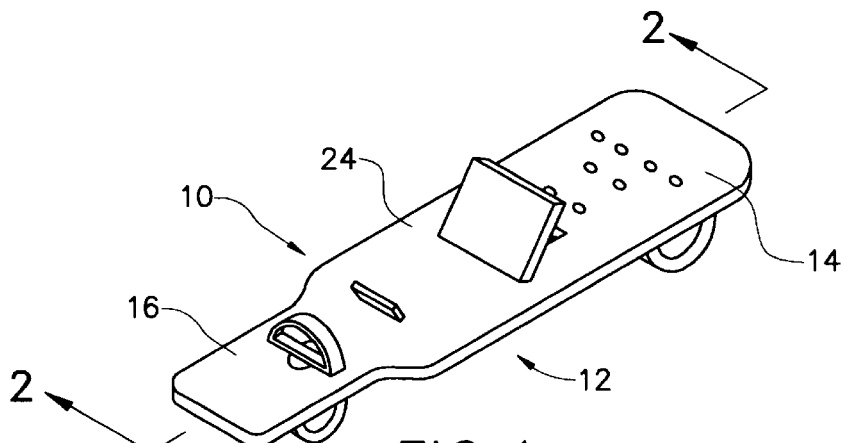
FIG. 1 is a top left side perspective view of an embodiment of the present invention.

For a better understanding of the invention reference is made to the following detailed description of the preferred embodiments thereof which should be taken in conjunction with the heretofore described drawings.

DETAILED DESCRIPTION OF THE PREFERRED EMBODIMENTS

Various aspects of the present invention will evolve from the following detailed description of the preferred embodiments thereof, which should be referenced to the prior delineated drawings.

The invention as a whole is depicted in the drawings by reference character 10. The foot driven vehicle 10 includes as one of its elements a platform 12 which may include a broad portion 14 and a narrowed portion 16. Platform 12 is shown in the embodiments of the present invention to be in the form of a plate of uniform thickness. Platform 12 may be constructed of any rigid or semi-rigid material such as metal, plastic, wood, and the like.

Figure 2:
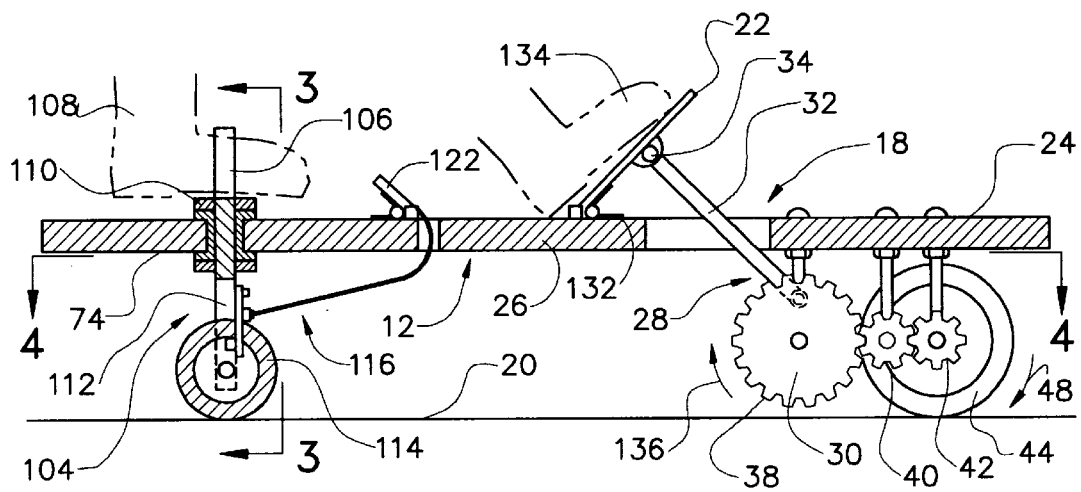
FIG. 2 is a sectional view taken along line 2—2 of FIG. 1.
Figure 3:
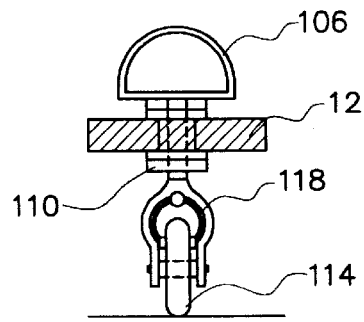
FIG. 3 is a sectional view taken along line 3—3 of FIG. 2.

Turning to FIG. 2, it may be seen that vehicle 10 includes as one of its elements motivating means 18 for urging platform 12 along a surface 20. Motivating means includes a foot pedal 22 attached to the upper surface 24 of platform 12 by hinge 26. Motivating means is further formed with a crank 28 having a gear wheel 30. Crank arm 32 is fastened to gear wheel 30 eccentrically. Arm or rod 32 also connects to foot pedal 22 through a pivot pin 34 which is fastened to a journal 36. Journal 36 is connected to foot pedal 22, FIG. 9. As depicted in FIG. 1, gear wheel 30 may be engaged at its endless surface 38, by spur gear 40, which in turn connects to gear 42 along the axis of first wheel 44.

Turning to FIG. 7 it may be seen that motivating means 46 includes many of the elements of motivating means 18. However, gear wheel 30 directly connects to gear 42 on wheel 44. Thus, with respect to FIGS. 2 and 7 it may be apparent that first wheel 44 turns in opposite directions when motivating means 18 or 46 is employed, directional arrows 48 and 50, FIGS. 2 and 7.

Figure 4:
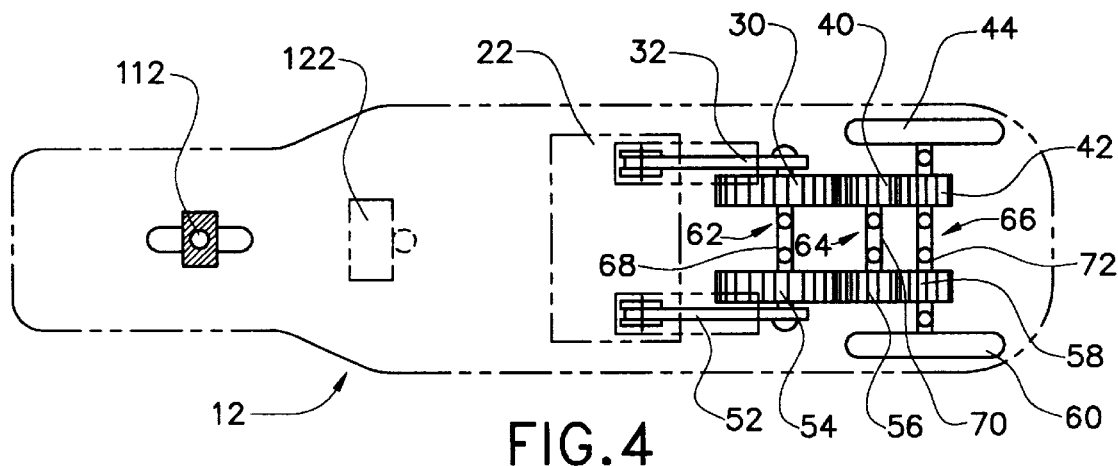
FIG. 4 is a top plan view of an embodiment of the motivating means appearing beneath the platform.
Figure 5:
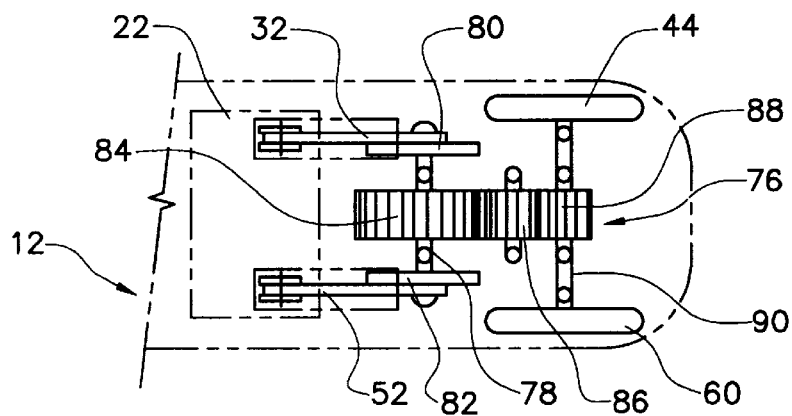
FIG. 5 is another embodiment of the motivating means appearing beneath the surface of the platform.
Figure 6:
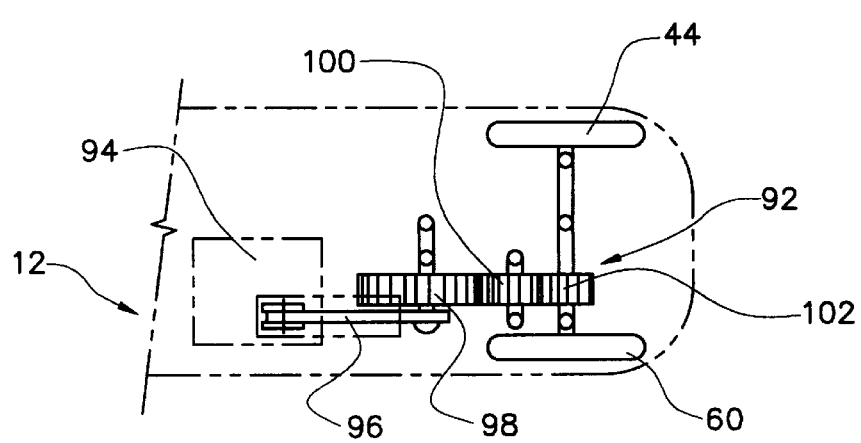
FIG. 6 is yet another embodiment of the motivating means appearing beneath the surface of the platform.

Turning now to FIGS. 4–6, it may be observed that variations of motivating means 18 is depicted. In FIG. 4, crank arm 52 is linked to gear wheel 54, spur gear 56, and gear 58 associated with wheel 60. Crank arm 52 is connected to pedal 22 in the same manner as crank arm 32. Pairs of shafts 62, 64, and 66 hold axles 68, 70, and 72 to the lower surface 74 of platform 12. Of course, axle 72 supports gears 42 and 58, as well as wheels 44 and 60.

FIG. 5 depicts another modification of the present invention 10, in which another motivating means 76 is depicted. Cranks 32 and 52 again are connected to foot pedal 12, but a single axle 78 connects discs 80 and 82 to gear wheel 84. Of course, arms 32 and 52 are eccentrically connected to discs 80 and 82 in the same manner as the connection depicted in FIG. 2 between rod 32 and gear wheel 30. Axle 78 then turns gear wheel 84 which in turn activates spur gear 86 and gear 88 fixed to axle 90 between wheels 44 and 60.

FIG. 6 depicts yet another embodiment of a motivating means 92. A foot pedal 94 of shortened configuration turns crank arm 96 which is eccentrically connected to gear wheel 98. Spur gear 100 and wheel gear 102 are turned according to the FIG. 2 depiction showing the turning of wheels 44 and 60.

Referring now to FIG. 2 once again, steering element 104 is shown. Steering element 104 includes a stirrup 106 engageable by a foot 108 of the user. Bearing 110 permits shaft 112 to turn within platform 12. Shaft 112 is connected to steering wheel fork, and axle 114 along an axis generally perpendicular to lower surface 74 of platform 12. It should be noted that steering element 104 depicted in FIG. 7 is substantially the same as that depicted in FIG. 2 except that foot 108 enters stirrup 106 from a different direction.

Brake means 116 is also found in the present invention. Brake means 116 includes a padded calliper 118 of conventional bicycle configuration with respect to steering wheel, fork and axle 114, FIG. 6 and 7. Cable 120 leads from a pedal 122 which is pivotally mounted by a pivot pin 124 by bracket 126. Bracket 126 is held to platform 12 by a fastener 128 which may be a screw, bolt, glue compound, and the like. Spring 130 biases pedal 122 into the position shown in FIG. 8. It should be noted that spring 132 also biases pedal 22 in the same manner to the position shown in FIGS. 2 and 7.

In operation, the user utilizes the mechanism 10 depicted in FIG. 2 by placing one foot 108 into stirrup 106 to steer wheel 114 by turning shaft 112. Another foot 134 presses pedal 22 to turn gear wheel 30 according to directional arrow 136. Wheel 44 or pairs of wheel 44 and 60 then move shown by directional arrow 48. The turning of crank and gear wheel 30 causes similar motion in wheels 44 and 60 as depicted in FIGS. 4–6. In the embodiment shown in FIG. 2, the user presses brake pedal 122 which operates the calliper and pads 118 on steering wheel 114 in the embodiment shown in FIGS. 2 or 7. It should be noted, however, that foot 134 in the embodiment shown in FIG. 2 would leave pedal 22 and move backwardly toward pedal 122 to activate brake means 116. In FIG. 7, foot 134 would leave foot pedal 122 and move forwardly to operate brake 116 by pressing pedal 122. In either case, the user of vehicle 10 has complete motional control.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A skateboard-like vehicle for transporting a rider, including:

a platform for supporting the rider in a standing position, said platform having longitudinally opposed ends;

first and second wheel assemblies that are ground-engaging and secured to said opposed ends of said platform;

means for propelling and means for steering said vehicle, both entirely by the feet of the rider;

said means for propelling including a foot pedal hingably secured to said platform, and means for connecting said foot pedal to a crank mechanism for driving said first wheel assembly;

said means for steering said vehicle including a shaft rotatably secured to said platform for supporting said second wheel assembly in a directionally variable manner, and means secured to said shaft for engaging a foot of the rider to steer said second wheel assembly.

2. The skateboard-like vehicle of claim 1, further including brake means for selectively arresting the rotation of at least one of said first and second wheel assemblies.

3. The skateboard-like vehicle of claim 2, wherein said brake means includes a hinged flange secured to said platform and disposed to be engaged by one foot of the rider.

4. The skateboard-like vehicle of claim 3, further including a caliper brake operatively associated with at least one of said first and second wheel assemblies, and means for operatively connecting said hinged flange to said caliper brake.

5. The skateboard-like vehicle of claim 4, wherein said hinged flange is disposed intermediate of said foot pedal and said means for engaging one foot for steering.

6. The skateboard-like vehicle of claim 4, wherein said means for operatively connecting said hinged flange to said caliper brake includes a brake cable.

7. The skateboard-like vehicle of claim 1, wherein said crank mechanism includes a crank eccentrically connected to an endless surface with gear teeth, and further including a driven gear connected to said first wheel assembly, said crank and driven gear being operatively coupled to transfer rotational motion of said crank to said first wheel assembly.

8. The skateboard-like vehicle of claim 7, further including a spur gear interposed between said crank and said driven gear for operatively connecting said crank and driven gear.

9. The skateboard-like vehicle of claim 7, wherein said gear teeth of said crank directly engage said driven gear.

10. The skateboard-like vehicle of claim 1, wherein said means secured to said shaft for engaging a foot of the rider includes a stirrup for transferring torque from the foot of the rider to said shaft for directing said second wheel assembly.

11. The skateboard-like vehicle of claim 1, wherein said foot pedal and said means for engaging a foot of the rider for steering are longitudinally spaced apart on said platform, and said means for propelling said vehicle is bidirectionally operable to propel said vehicle with either said first wheel assembly leading said second wheel assembly, or said second wheel assembly leading said first wheel assembly.

12. A skateboard-like vehicle for transporting a rider, including:

a platform for supporting the rider in a standing position, said platform having longitudinally opposed ends;

first and second wheel assemblies that are ground-engaging and secured to said opposed ends of said platform;

means for propelling and means for steering said vehicle, both entirely by the feet of the rider;

said means for propelling including a foot pedal hingably secured to said platform, and means for connecting said foot pedal to a crank mechanism for driving said first wheel assembly;

brake means for selectively arresting the rotation of at least one of said first and second wheel assemblies;

said brake means includes a hinged flange secured to said platform and disposed to be engaged by one foot of the rider.

13. The skateboard-like vehicle of claim 12, further including a caliper brake operatively associated with at least one of said first and second wheel assemblies, and cable means for operatively connecting said hinged flange to said caliper brake.

14. The skateboard-like vehicle of claim 12, wherein said crank mechanism includes a crank eccentrically connected to an endless surface with gear teeth, and further including a driven gear connected to said first wheel assembly, said crank and driven gear being operatively coupled to transfer rotational motion of said crank to said first wheel assembly.

* * * * *